United States Patent
Suzuki

(10) Patent No.: US 12,459,424 B2
(45) Date of Patent: Nov. 4, 2025

(54) VEHICLE LAMP CONTROL DEVICE, AND VEHICLE LAMP

(71) Applicant: Ichikoh Industries, Ltd., Isehara (JP)

(72) Inventor: Yasufumi Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 145 days.

(21) Appl. No.: 18/554,753

(22) PCT Filed: Apr. 12, 2022

(86) PCT No.: PCT/JP2022/017591
§ 371 (c)(1),
(2) Date: Oct. 10, 2023

(87) PCT Pub. No.: WO2022/220241
PCT Pub. Date: Oct. 20, 2022

(65) Prior Publication Data
US 2024/0198892 A1    Jun. 20, 2024

(30) Foreign Application Priority Data
Apr. 12, 2021 (JP) .................................. 2021-067283

(51) Int. Cl.
*B60Q 1/14* (2006.01)
*B60W 60/00* (2020.01)

(52) U.S. Cl.
CPC ........ *B60Q 1/143* (2013.01); *B60Q 2300/054* (2013.01); *B60Q 2300/112* (2013.01); *B60W 60/00* (2020.02)

(58) Field of Classification Search
CPC .............. B60Q 1/143; B60Q 2300/054; B60Q 2300/112; B60Q 1/249; B60Q 1/085; B60Q 2800/10; B60W 60/00; F21W 2102/13
See application file for complete search history.

(56) References Cited

U.S. PATENT DOCUMENTS

| | | | |
|---|---|---|---|
| 2007/0183168 A1* | 8/2007 | Naganawa | F21S 41/635 362/544 |
| 2009/0190324 A1* | 7/2009 | Watanabe | F21S 41/143 362/466 |
| 2016/0281951 A1* | 9/2016 | Nakazato | B60Q 1/18 |

FOREIGN PATENT DOCUMENTS

| | | |
|---|---|---|
| DE | 10 2008 036 193 A1 | 2/2010 |
| DE | 10 2015 115 954 A1 | 3/2016 |

(Continued)

OTHER PUBLICATIONS

International Search Report issued Jun. 7, 2022 in PCT/JP2022/017591 filed on Apr. 12, 2022, 2 pages.

(Continued)

*Primary Examiner* — Abdullah A Riyami
*Assistant Examiner* — Syed M Kaiser
(74) *Attorney, Agent, or Firm* — Oblon, McClelland, Maier & Neustadt, L.L.P.

(57) ABSTRACT

The present invention provides: a vehicle lamp control device that can extend, in accordance with the vehicle speed, the distance over which a vehicle-mounted sensor can detect objects; and a vehicle lamp. Provided is a vehicle lamp control device for controlling headlights which are mounted onto a vehicle provided with an autonomous driving function or a driving assistance function and emit light distribution patterns (PA-L, PA-M, PA-H) forward of the vehicle, wherein when the vehicle is in an autonomous driving state or a driving assistance state, the widths (WH) of the hot zones (HA-L, HA-M, HA-H) of the light distribution patterns (PA-L, PA-M, PA-H) are expanded in increments or continuously as the traveling speed of the vehicle increases.

7 Claims, 3 Drawing Sheets

(56) References Cited

FOREIGN PATENT DOCUMENTS

| DE | 10 2017 001 506 A1 | 8/2018 | | |
|---|---|---|---|---|
| EP | 1 125 792 A2 | 8/2001 | | |
| EP | 1234717 A2 * | 8/2002 | ............. | B60Q 1/085 |
| EP | 1 621 400 A1 | 2/2006 | | |
| EP | 2 113 713 A1 | 11/2009 | | |
| EP | 3115256 A1 * | 1/2017 | ............... | B60Q 1/08 |
| JP | 2001-270383 A | 10/2001 | | |
| JP | 2020-26199 A | 2/2020 | | |
| JP | 2020-32872 A | 3/2020 | | |
| WO | WO 2018/164269 A1 | 9/2018 | | |
| WO | WO 2019/026437 A1 | 2/2019 | | |
| WO | WO 2019/082980 A1 | 5/2019 | | |

OTHER PUBLICATIONS

Extended European Search Report issued Feb. 11, 2025, in corresponding European Patent Application No. 22788166.1, 11 pages.

* cited by examiner

VEHICLE LAMP CONTROL DEVICE, AND VEHICLE LAMP

TECHNICAL FIELD

The present invention relates to a control device for a vehicular lamp and a vehicular lamp.

BACKGROUND ART

As a control device for a vehicle lamp, a device which performs control of the vehicle lamp different from a control performed when the manual operation mode is set when the automatic driving operation mode is set is known (see, for example, Patent Documents 1 to 5). For example, in the control device disclosed in Patent Document 1, a light distribution pattern for a low beam is formed when the manual operation mode is set, and a light distribution pattern in which a region of high illuminance is located on the upper side is formed when the automatic driving operation mode is set.

CITATION LIST

Patent Literature

Patent Literature 1: WO 2019/082980
Patent Literature 2: WO 2019/026437
Patent Literature 3: WO 2018/164269
Patent Literature 4: JP 2020-32872 A
Patent Literature 5: JP 2020-26199 A

SUMMARY OF THE INVENTION

Problems to be Solved by the Invention

In an automatic driving operation system that executes driving support, conditional automatic driving operation, automatic driving operation, full automatic driving operation, etc., based on signals from on-vehicle sensors such as cameras, millimeter wave radar, LiDAR (Light Detection and Ranging), sonar, etc., the distance over which an object can be detected by the on-vehicle sensors tends to become shorter when the surroundings become dark. Further, in the automatic driving operation system, it is necessary that the detection of the target object by the on-vehicle sensor is made faster as the vehicle speed increases, so that it is necessary to extend the detectable distance of the target object by the on-vehicle sensor as the vehicle speed increases.

In view of the above circumstances, it is an object of the present invention to provide a control apparatus for a vehicular lamp and a vehicular lamp capable of extending a detectable distance of an object by an on-vehicle sensor according to a vehicle speed.

Means for Solving the Problem

The present invention is a control device for a vehicle lamp that is mounted on a vehicle having an automatic driving operation function or a driving support function and controls a lamp that irradiates a light distribution pattern toward the front of the vehicle, wherein when the vehicle is in an automatic driving operation state or a driving support state, the width of a hot zone of the light distribution pattern is expanded stepwise or continuously as the traveling speed of the vehicle increases.

Effect of the Invention

According to the present invention, the width of the hot zone of the light distribution pattern is expanded stepwise or continuously as the traveling speed of the vehicle increases, so that the further distance is illuminated with higher illuminance as the traveling speed of the vehicle increases. Therefore, it is possible to extend the detectable distance of the object by the on-vehicle sensor according to the vehicle speed.

EMBODIMENT FOR CARRYING OUT THE INVENTION

Hereinafter, the present invention will be described according to a preferred embodiment. It should be noted that the present invention is not limited to the following embodiments and can be modified appropriately without departing from the spirit of the present invention. Further, in the embodiments described below; there are some parts in which illustration and description of the configuration are omitted, but as for details of omitted techniques, publicly known or well-known techniques are appropriately applied within a range that does not conflict with the contents described below.

Figure 1:
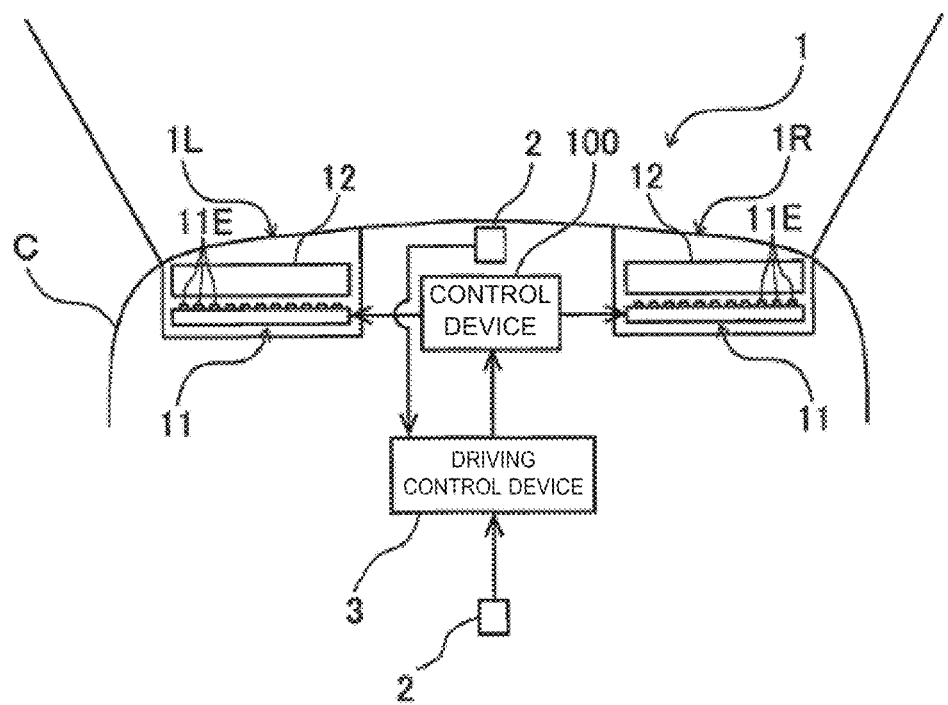
FIG. 1 is a diagram schematically showing a control apparatus for a vehicular lamp according to an embodiment of the present invention.

FIG. 1 is a schematic diagram showing a control device 100 of a vehicular lamp 1 according to an embodiment of the present invention. A control device 100 of the vehicular lamp 1 shown in this figure is a control unit for controlling the vehicular lamp 1 mounted on a vehicle C equipped with an automatic driving function or a driving support function. Automatic driving operation includes conditional automatic driving operation (equivalent to automatic driving operation level 3), automatic driving operation (equivalent to automatic driving operation level 4), and full automatic driving operation (equivalent to automatic driving operation level 5). The driving assistance includes driving in which the accelerator brake operation or the steering wheel operation is partially automated (corresponding to automatic driving operation level 1), and driving in which both the accelerator brake operation and the steering wheel operation are partially automated (corresponding to automatic driving level 2). Further, the vehicle C can be set in a manual operation mode. The manual driving is an operation when the automatic driving function or the driving support function is not executed.

A vehicle C comprises an on-board sensor 2 such as a camera, a radar (millimeter wave radar), a LiDAR, a sonar, or the like, and a driving control device 3 for executing an automatic driving function or a driving support function. The on-vehicle sensor 2 is installed on the vehicle C so as to face the front of the vehicle, and performs image detection of an object, distance measurement, and the like. At least one of the on-vehicle sensors 2 (for example, a camera) is installed at a position higher than the eye point of the driver in the vehicle C, such as an upper part of a windshield.

A driving control device 3 automates at least one of an accelerator operation, a brake operation and a steering operation of a vehicle C according to a signal from an on-vehicle sensor 2. The operation control device 3 transmits a control signal to the control device 100 of the vehicular lamp 1 when executing the automatic driving operation function or the driving support function. It should be noted that the operation control device 3 and the control device 100 of the vehicular lamp 1 may be formed as an integrated control unit.

A vehicle lamp 1 is provided with left and right headlamps 1L, 1R. The headlights 1L, 1R are provided with a light source unit 11 and an optical system 12, and emit a light distribution pattern toward the front of the vehicle. The light source unit 11 comprises a plurality of light emitting elements 11E. Each of the plurality of light-emitting elements 11E is an LED (Light Emitting Diode), a laser diode, or the like, and is individually dimmed by the control device 100. For example, in the case where the light emitting element 11E is an LED, the lighting time is controlled by a PWM (Pulse Width Modulation) system so that the light is modulated.

Examples of the light source unit 11 include a light source unit in which a plurality of light emitting elements 11E such as an LED array are arranged in the vehicle width direction, a light source unit in which a plurality of light emitting elements 11E are arranged in a matrix, a light source unit in which a plurality of light emitting elements 11E are spaced apart from each other and arranged in the same direction, and a light source unit in which a plurality of light emitting elements 11E are spaced apart from each other and arranged in different directions. When the plurality of light emitting elements (11E) are spaced apart from each other and arranged in the same direction, the light emitted from the plurality of light emitting elements (11E) is guided in the same direction by the light guide member provided in the optical system (12). When the plurality of light-emitting elements 11E are spaced apart from each other and arranged in different directions, the mirror unit included in the optical system 12 guides light emitted from the plurality of light-emitting elements 11E in the same direction.

A plurality of light emitting elements 11E are individually dimmed by a control device 100, whereby a light distribution pattern irradiated toward the front of the vehicle by the headlights 1L, 1R changes. Examples of the change in the light distribution pattern include a change in the width, height and position of the hot zone of the light distribution pattern, a change in the width, height and position of the whole light distribution pattern, and the like. Here, the hot zone is a region having the highest illumination in the light distribution pattern.

Figure 2:
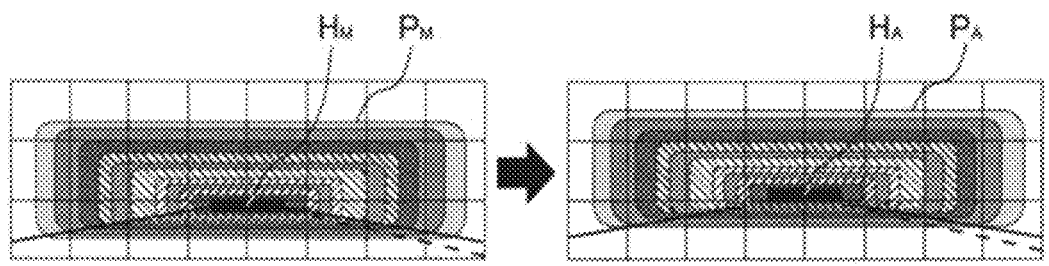
FIG. 2 is a diagram showing a light distribution pattern for a high beam when a manual operation mode is set and a light distribution pattern when an automatic driving operation mode or a driving assistance mode is set.

FIG. 2 is a diagram showing a light distribution pattern PM for a high beam when a manual operation mode is set and a light distribution pattern PA when an automatic driving operation mode or a driving assistance mode (hereinafter referred to as an automatic driving operation mode or the like) is set. The light distribution pattern PM for the high beam when the manual operation mode is set is shown on the left side of FIG. 2, and the light distribution pattern PA when the automatic driving operation mode or the like is set is shown on the right side of FIG. 2. The hot zone HA is positioned at the center of the light distribution pattern PA.

As shown in FIG. 2, the hot zone HA of the light distribution pattern PA when the automatic driving operation mode or the like is set is positioned above the hot zone HM of the light distribution pattern PM for the high beam when the manual operation mode is set. That is, when the automatic driving operation mode or the like is set, the control device 100 adjusts the optical axis extending from the headlights 1L, 1R to the center of the hot zone HA upward from the optical axis extending from the headlights 1L, 1R to the center of the hot zone HM when the manual operation mode is set.

Here, the light distribution pattern P M in the case where the manual operation mode and the high beam mode are set is a light distribution pattern which emphasizes the irradiation to the road surface rather than the irradiation to the space in accordance with the eye point of the driver. On the other hand, the light distribution pattern PA in the case where the automatic driving operation mode or the like is set is a light distribution pattern that emphasizes the irradiation to the space rather than the irradiation to the road surface in accordance with the detection axis of the on-vehicle sensor 2 (see FIG. 2) installed at a position higher than the eye point of the driver.

Thus, when the automatic driving operation mode or the like is set, the distant illuminance can be increased in accordance with the detection axis of the on-vehicle sensor 2 as compared with the light distribution pattern (PA) when the manual operation mode and the high beam mode are set, and the distance in which the object can be detected by the on-vehicle sensor 2 can be extended.

Figure 3:
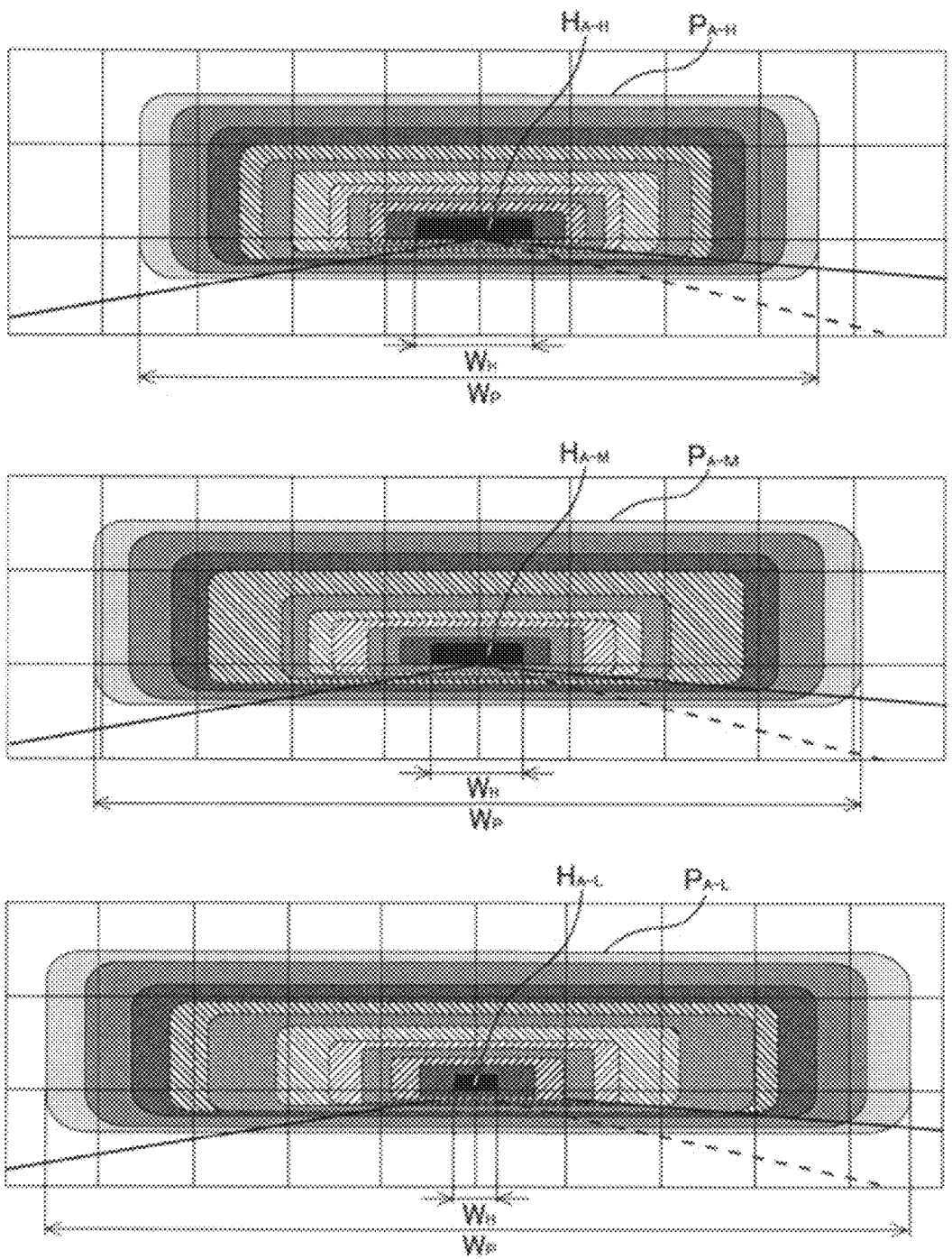
FIG. 3 is a diagram showing a light distribution pattern in a case where an automatic driving operation mode or a driving assistance mode is set.

FIG. 3 is a diagram showing light distribution patterns PA-L, PA-M, and PA-H in a case where an automatic driving operation mode or the like is set. The lower part of FIG. 3 shows a light distribution pattern PA-L in a case where an automatic driving operation mode or the like is set and a vehicle speed is set in a low speed range (for example, 40 to 60 km/h). The middle part of FIG. 3 shows a light distribution pattern PA-M in a case where an automatic driving operation mode or the like is set and a vehicle speed is set in a middle speed range (for example, 60 to 80 km/h). Further, the upper part of FIG. 3 shows a light distribution pattern PA-H in a case where an automatic driving operation mode or the like is set and a vehicle speed is set in a high speed range (for example, 80 to km/h). The hot zones HA-L, HA-M, and HA-H are positioned at the center of the light distribution patterns PA-L, P A-M, and PA-H, respectively.

As shown in the lower part of FIG. 3, when the automatic driving operation mode or the like is set and the vehicle speed is set in the low-speed range, the light distribution pattern PA-L having a wider width WP than when the vehicle speed is set in the relatively high vehicle speed range is formed. The width WH of the hot zone HA-L of the light distribution pattern PA-L is set so as to be narrower than when the vehicle speed is set in the range of relatively high vehicle speed. This light distribution pattern PA-L is a light distribution pattern which emphasizes irradiating a wide range of left and right sides rather than increasing the illuminance at the center. As a result, when the automatic driving operation mode or the like is set and the vehicle speed is set in the low speed range, the detectable viewing angle of the on-vehicle sensor 2 (see FIG. 1) can be widened as compared with the case where the vehicle speed is set in the relatively high vehicle speed range. Therefore, a pedestrian or a marker located obliquely in front of the vehicle C can be included in the viewing angle detectable by the on-vehicle sensor 2.

As shown in the upper part of FIG. 3, when the automatic driving operation mode or the like is set and the vehicle speed is set in the high-speed range, the light distribution pattern PA-H having a narrower width WP is formed compared to the case where the vehicle speed is set in the relatively low vehicle speed range. The width WH of the hot zone HA-H of the light distribution pattern PA-H is set to be larger than that when the vehicle speed is set in a relatively low vehicle speed range. This light distribution pattern PA-H is a light distribution pattern in which emphasis is placed on increasing the illuminance at the center rather than irradiating a wide range of light to the left and right. Thus, when the automatic driving operation mode or the like is set and the vehicle speed is set in the high speed range, the detection distance of the target object by the on-vehicle sensor (2) can be extended as compared with the case where the vehicle speed is set in the relatively low vehicle speed range.

As shown in the middle part of FIG. 3, when the automatic driving operation mode or the like is set and the vehicle speed is set in the medium speed range, a light distribution pattern PA-M having a width WP smaller than that when the vehicle speed is set in the low speed range and a width WP larger than that when the vehicle speed is set in the high speed range is formed. The width WH of the hot zone HA-M of the light distribution pattern PA-M is set so as to be wider than when the vehicle speed is set in the low speed range and narrower than when the vehicle speed is set in the high speed range. This light distribution pattern PA-M is a light distribution pattern which emphasizes a balance between irradiating a wide range of left and right and increasing illuminance at the center. As a result, when an automatic driving operation mode or the like is set and the vehicle speed is set in a medium-speed range, the viewing angle detectable by the on-vehicle sensor 2 can be expanded compared to when the vehicle speed is set in a relatively high vehicle speed range, and on the other hand, the detectable distance of the object of the on-vehicle sensor 2 can be expanded compared to when the vehicle speed is set in a relatively low vehicle speed range.

That is, the control device 100 (see FIG. 1) changes the overall width (WP) of the light distribution patterns (PA-L, PA-M, PA-H) irradiated by the headlights (1L, 1R) (see FIG. 1) and also changes the width (WH) of the hot zones (HA-L, HA-M, HA-H) of the light distribution patterns (PA-L, PA-M. P A-H) irradiated by the headlights (1L, 1R) according to the set vehicle speed range. Specifically, the control device (100) stepwise (gradually) decreases the overall width (WP) of the light distribution patterns (PA-L, PA-M. PA-H) and stepwise (gradually) increases the width (WH) of the hot zones (HA-L, HA-M, HA-H) as the vehicle speed region changes to the high-speed side such as from a low-speed region to a medium-speed region and a high-speed region.

In this way, the control device 100 adjusts the light of the light source unit 11 so that the density of the light energy emitted from the light source unit 11 (see FIG. 1) changes in accordance with the set vehicle speed range. Specifically, the control device (100) modulates the light of the light source unit 11 so that the density of the light energy emitted from the light source unit 11 stepwise (gradually) increases as the vehicle speed range changes to the high-speed side such as from a low-speed range to a medium-speed range and a high-speed range. Here, when the vehicle speed is set in a relatively low-speed region. the level required for the detectable distance of the target object of the on-vehicle sensor 2 is low; while the level required for the detectable viewing angle of the on-vehicle sensor 2 is high, compared to when the vehicle speed is set in a relatively high-speed region. Further, when the vehicle speed is set in a relatively high-speed region, the required level for the detectable viewing angle of the on-vehicle sensor 2 is low, while the required level for the detectable distance of the on-vehicle sensor 2 is high, compared with when the vehicle speed is set in a relatively low-speed region. Therefore, in the present embodiment, the light energy emitted from the light source unit 11 is distributed in accordance with a required level for the detectable distance and the detectable viewing angle of the on-vehicle sensor 2 corresponding to the vehicle speed. As a result, while suppressing the power consumption of the light source unit 11, it is possible to extend the detectable distance of the object by the on-vehicle sensor 2 in accordance with the vehicle speed, and to ensure the necessary detectable viewing angle by the on-vehicle sensor 2.

Figure 4:
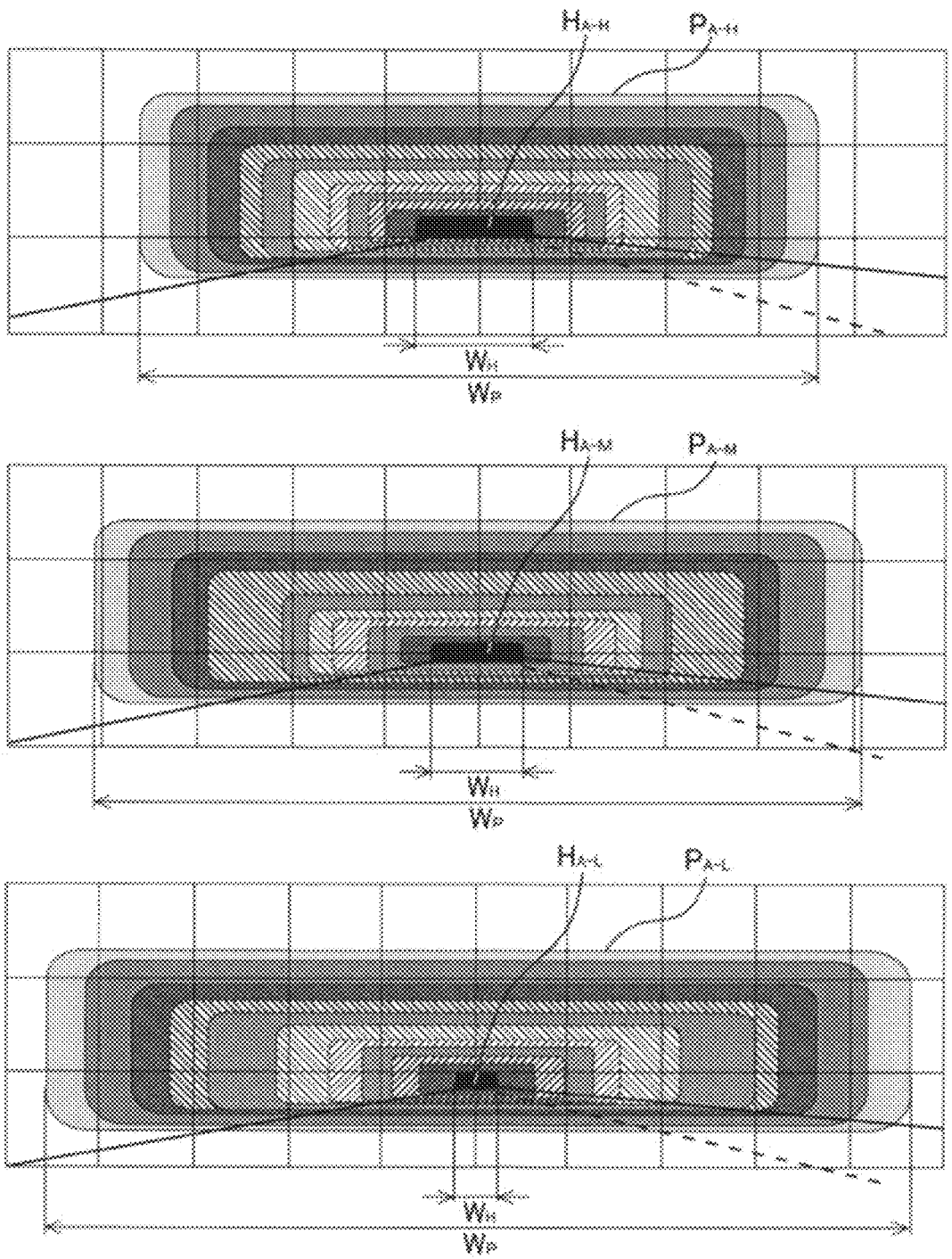
FIG. 4 is a diagram showing another embodiment of a light distribution pattern in a case where an automatic driving operation mode or a driving assistance mode is set.

FIG. 4 is a diagram showing another embodiment of the light distribution pattern PA-L. PA-M, PA-H in the case where the automatic driving operation mode or the like is set. The lower part of FIG. 4 shows the light distribution pattern PA-L in a case where the automatic driving operation mode or the like is set and the vehicle speed is set in a low speed range (for example, 40 to 60 km/h). The middle part of FIG. 4 shows the light distribution pattern PA-M in the case where the automatic driving operation mode or the like is set and the vehicle speed is set in the middle speed range (for example, 60 to 80 km/h). Further, the upper part of FIG. 4 shows a light distribution pattern PA-H in a case where an automatic driving operation mode or the like is set and the vehicle speed is set in a high speed range (for example, 80 to km/h).

Similarly to the above-described embodiment, the control device 100 stepwise (gradually) decreases the overall width (WP) of the light distribution patterns (PA-L, PA-M, PA-H) and stepwise (gradually) increases the width (WH) of the hot zones (HA-L, HA-M, HA-H) as the vehicle speed range changes to the high-speed side such as from the low-speed range to the medium-speed range and the high-speed range. In addition, the control device 100 stepwise (gradually) raises the heights of the hot zones HA-L, HA-M, and HA-H as the vehicle speed range changes to the high-speed side such as from the low-speed range to the medium-speed range and the high-speed range.

Here, when the automatic driving operation mode or the like is set and the vehicle speed range is set to the high speed range, the hot zone HA-H is set to a higher position than the hot zone HM when the manual operation mode is set. The hot zones HA-L and HA-M in the case where the automatic driving operation mode or the like is set and the vehicle speed range is set to a middle speed range or a low speed range may be set at a position higher than the hot zone HM of the high-beam light distribution pattern PM in the case where the manual operation mode is set, or may be set at the same height as the hot zone HM.

As described above, in the present embodiment, since the heights of the hot zones HA-L, HA-M, and HA-H are stepwise (gradually) increased as the vehicle speed range changes to the high-speed side such as from the low-speed range to the medium-speed range and the high-speed range, it becomes possible to satisfy the required level for the detectable distance of the on-vehicle sensor 2 corresponding to the vehicle speed.

Although the present invention has been described based on the embodiments described above, the present invention is not limited to the embodiments described above, and modifications may be made without departing from the spirit of the present invention, or techniques of the embodiments may be combined with known or well-known techniques.

For example, in the above-described embodiment, while the widths WH of the hot zones HA-L, HA-M, and HA-H are stepwise (gradually) expanded when the vehicle speed range changes to the high-speed side such as from the low-speed range to the medium-speed range and the high-speed range, the widths WH of the hot zones HA-L, HA-M, and HA-H may be continuously expanded as the vehicle speed increases. Further, in the above-described embodiment, while the overall width WP of the light distribution patterns PA-L, PA-M, and PA-H is stepwise (gradually) decreased as the vehicle speed region changes to the high-speed side such as from the low-speed region to the medium-speed region and the high-speed region, the overall width WP of the light distribution patterns PA-L, PA-M, and PA-H may be continuously decreased as the vehicle speed increases.

Further, in the above-described embodiment, the widths WH of the hot zones HA-L, HA-M, and HA-H are increased as the vehicle speed range changes to the high-speed side such as from the low-speed range to the medium-speed range and the high-speed range, but this is not essential. For example, the widths (WH) of the hot zones (HA-L, H A-M) may be expanded when the vehicle speed range changes from a low speed range to a medium speed range, but the widths (WH) of the hot zones (HA-M, HA-H) may not be changed when the vehicle speed range changes from a medium speed range to a high speed range, or the widths (WH) of the hot zones (HA-L, HA-M) may not be changed when the vehicle speed range changes from a low speed range to a medium speed range, but the widths (WH) of the hot zones (HA-M, HA-H) may be expanded when the vehicle speed range changes from a medium speed range to a high speed range.

Further, in the above-described embodiment, the overall width WP of the light distribution patterns PA-L, PA-M, and PA-H is reduced as the vehicle speed range changes to the high-speed side such as from the low-speed range to the medium-speed range and the high-speed range, but this is not essential. For example, it is possible to reduce the overall width (WP) of the light distribution patterns (PA-L, PA-M) when the vehicle speed range changes from a low-speed range to a medium-speed range, but not to change the overall width (WP) of the light distribution patterns (PA-M, PA-H) when the vehicle speed range changes from a medium-speed range to a high-speed range, change the overall width (W P) of the light distribution patterns (PA-L, PA-M) when the vehicle speed range changes from a low speed range to a medium speed range, but to decrease the overall width (WP) of the light distribution patterns (PA-M, PA-H) when the vehicle speed range changes from a medium speed range to a high speed range.

Further, in the above-described embodiment, the heights of the hot zones HA-L, HA-M, and HA-H are stepwise (gradually) increased as the vehicle speed range changes to the high-speed side such as from the low-speed range to the medium-speed range and the high-speed range, but the heights of the hot zones HA-L, HA-M, and HA-H may be continuously increased as the vehicle speed increases.

In the above-described embodiment, the heights of the hot zones HA-L, HA-M, and HA-H are increased as the vehicle speed range changes to the high-speed side such as from the low-speed range to the medium-speed range and the high-speed range, but this is not necessary. For example, it is possible to increase the heights of the hot zones (HA-L, HA-M) when the vehicle speed range changes from a low speed range to a medium speed range, but not to change the heights of the hot zones (H A-M, HA-H) when the vehicle speed range changes from a medium speed range to a high speed range, or not to change the heights of the hot zones (HA-L, HA-M) when the vehicle speed range changes from a low speed range to a medium speed range, but not to change the heights of the hot zones (HA-M, HA-H) when the vehicle speed range changes from a medium speed range to a high speed range.

Further, in the above-described embodiment, while the overall width WP of the light distribution patterns PA-L, PA-M, and PA-H is reduced when the vehicle speed range changes to the high-speed side such as the low-speed range, the medium-speed range, and the high-speed range, the overall width WP of the light distribution patterns PA-L, PA-M, and PA-H may be constant regardless of the change of the vehicle speed.

DESCRIPTION OF REFERENCE NUMERALS

1: Vehicular lamp
1L, 1R: Headlamp (lamp)
100: Control device
C: Vehicle PA: Light distribution pattern
PA-L: Light distribution pattern
PA-M: Light distribution pattern
PA-H: Light distribution pattern
PM: Light distribution pattern
HA: Hot zone
HA-L: Hot zone
HA-M: Hot zone
HA-H: Hot zone
HM—Hot zone
WP: Overall width
WH: Width

The invention claimed is:

1. A control device comprising circuitry controlling a lamp that is mounted on a vehicle that is equipped with an automatic driving operation function or a driving support function and irradiates a light distribution pattern including a hot zone to the front of the vehicle, wherein
the control device being arranged to control the lamp in accordance with a traveling speed of the vehicle, and
when the vehicle is in an automatic driving operation state or a driving support state, the control device controls the width of the hot zone of the light distribution pattern so that the width stepwise or continuously expands as the traveling speed of the vehicle increases.

2. The control device according to claim 1, wherein when the vehicle is in automatic automatic driving operation state or the driving support state, the control device controls the overall width of the light distribution pattern so that the overall width stepwise or continuously reduces as the traveling speed of the vehicle increases.

3. The control device according to claim 1, wherein when the vehicle is in the automatic driving operation state or the driving support state, the control device controls the height of the hot zone of the light distribution pattern so that the height stepwise or continuously increases as the traveling speed of the vehicle increases.

4. The control device according to claim 1, wherein when the vehicle is in the automatic driving operation state or the driving support state, the control device controls the hot zone of the light distribution pattern so that the hot zone is made higher than a hot zone of a light distribution pattern for a high beam when the vehicle is not in the automatic driving operation state or the driving support state.

5. The control device according to claim 1, wherein an on-vehicle sensor for detecting an object positioned in front of the vehicle is installed at a position higher than an eye point of a driver in the vehicle.

6. A vehicular lamp comprising the control device according to claim 1.

7. A control device comprising circuitry for controlling a lamp that is mounted on a vehicle that is equipped with an automatic driving operation function or a driving support function and irradiates a light distribution pattern including a hot zone to the front of the vehicle, wherein
- the control device being arranged to control the lamp in accordance with a traveling speed of the vehicle,
- when the vehicle is in an automatic driving operation state or a driving support state, the control device controls the width of the hot zone of the light distribution pattern so that the width stepwise or continuously expands as the traveling speed of the vehicle increases, and
- when the vehicle is in the automatic driving operation state or the driving support state, the control device controls the hot zone of the light distribution pattern so that the hot zone is made higher than a hot zone of a light distribution pattern for a high beam when the vehicle is not in the automatic driving operation state or the driving support state.

\* \* \* \* \*